No. 855,119. PATENTED MAY 28, 1907.
B. B. MOSS.
CARAMEL WRAPPING MACHINE.
APPLICATION FILED AUG. 7, 1905.
7 SHEETS—SHEET 5.
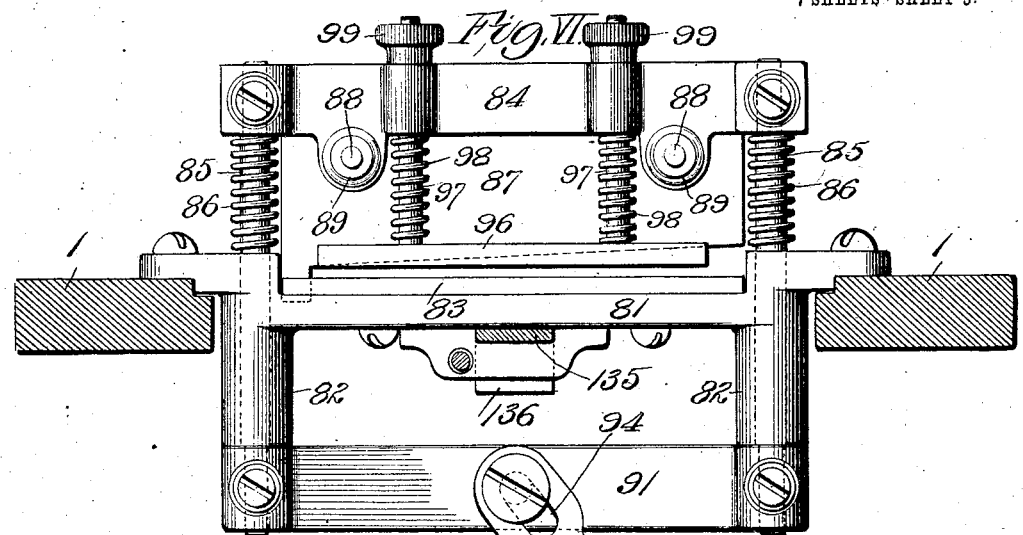
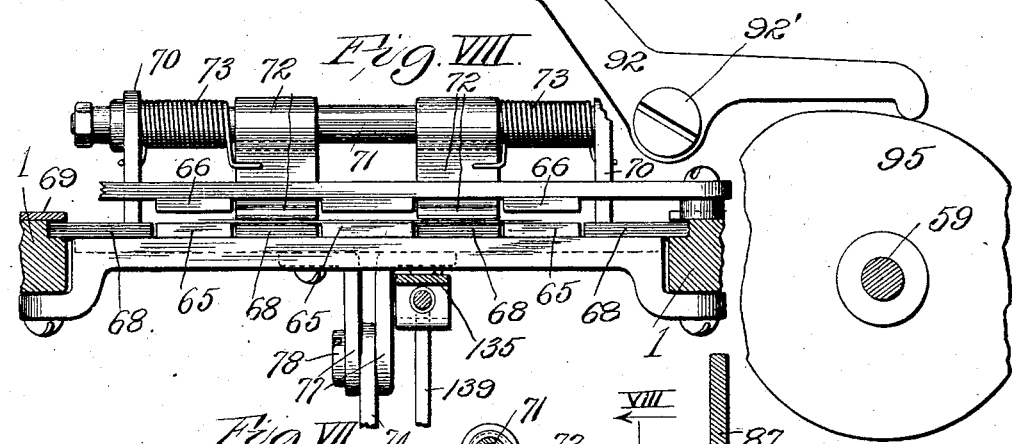
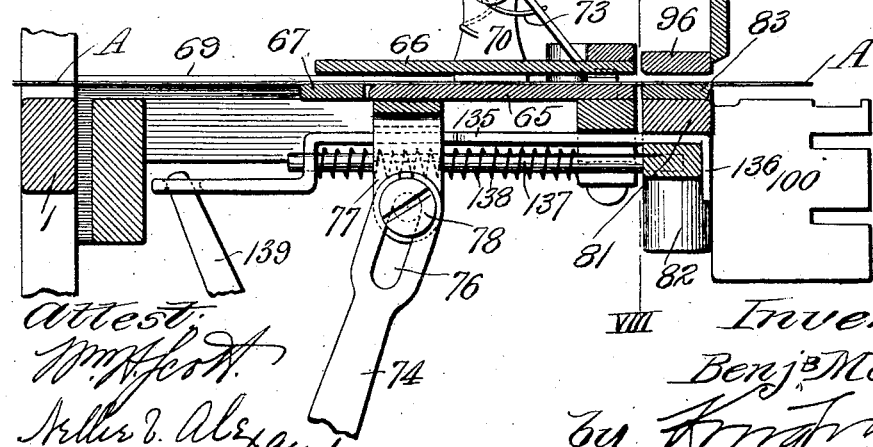
Attest:
Inventor
Benj. B. Moss, No. 855,119. PATENTED MAY 28, 1907.
B. B. MOSS.
CARAMEL WRAPPING MACHINE.
APPLICATION FILED AUG. 7, 1905.
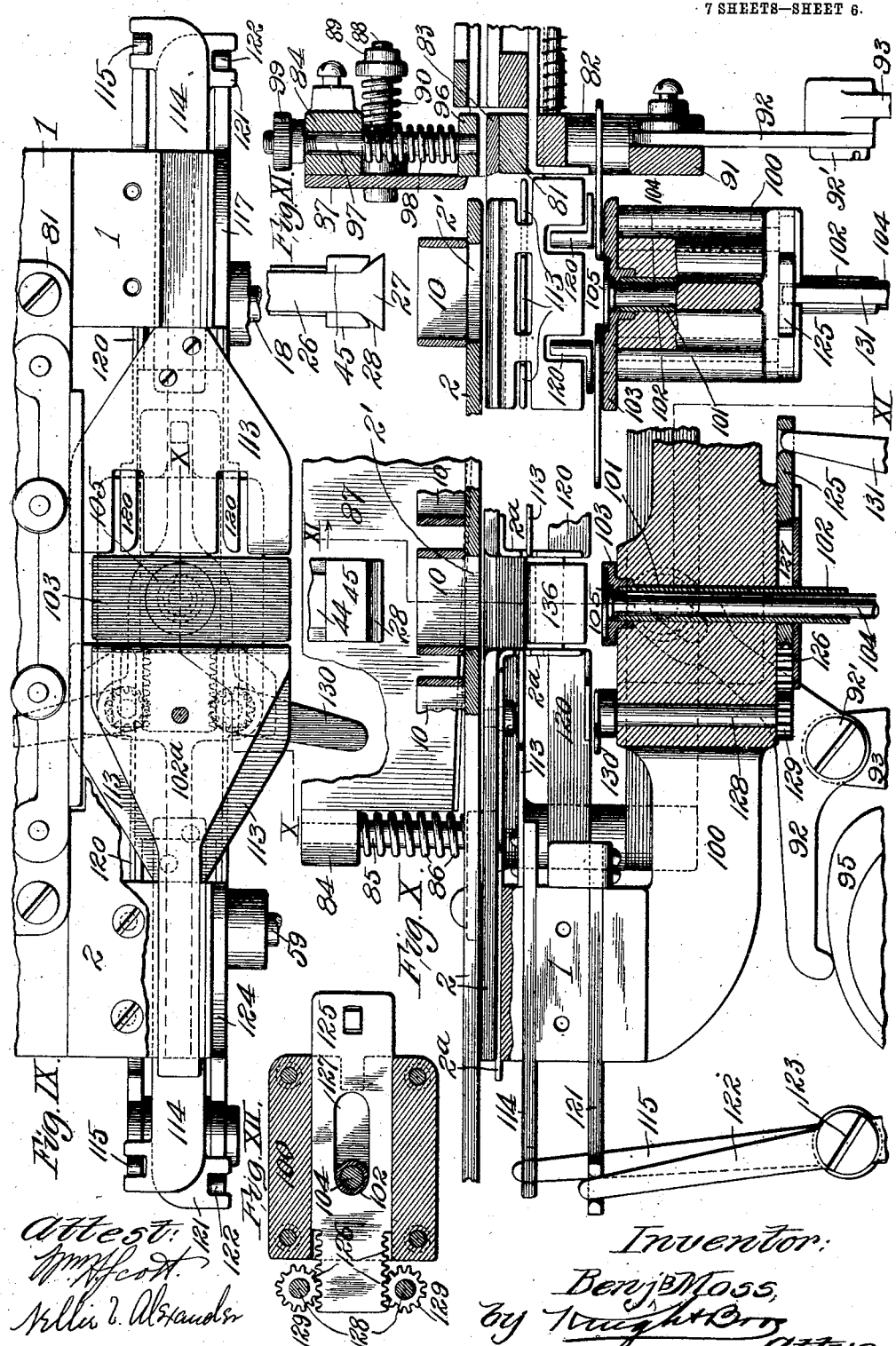

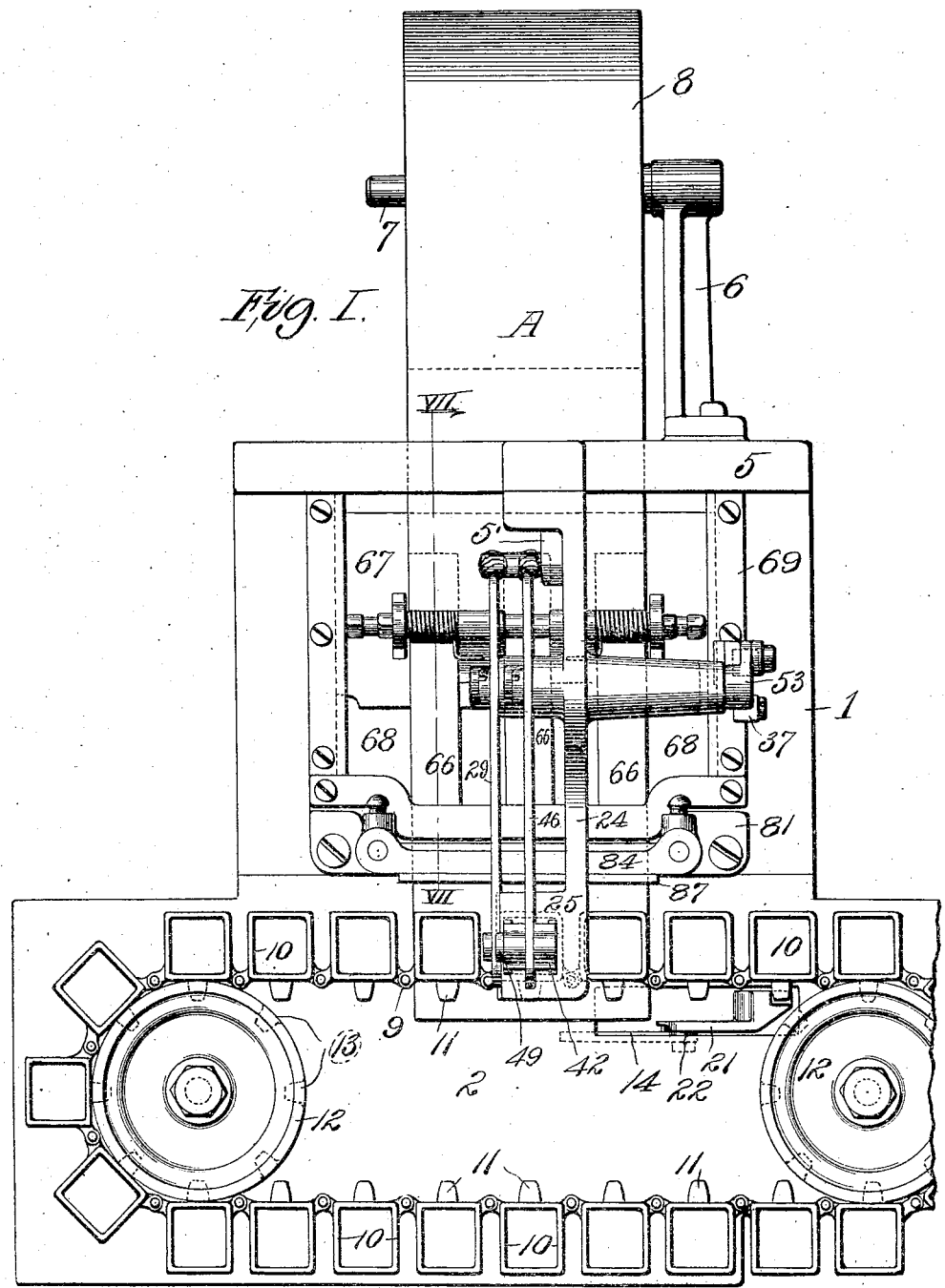

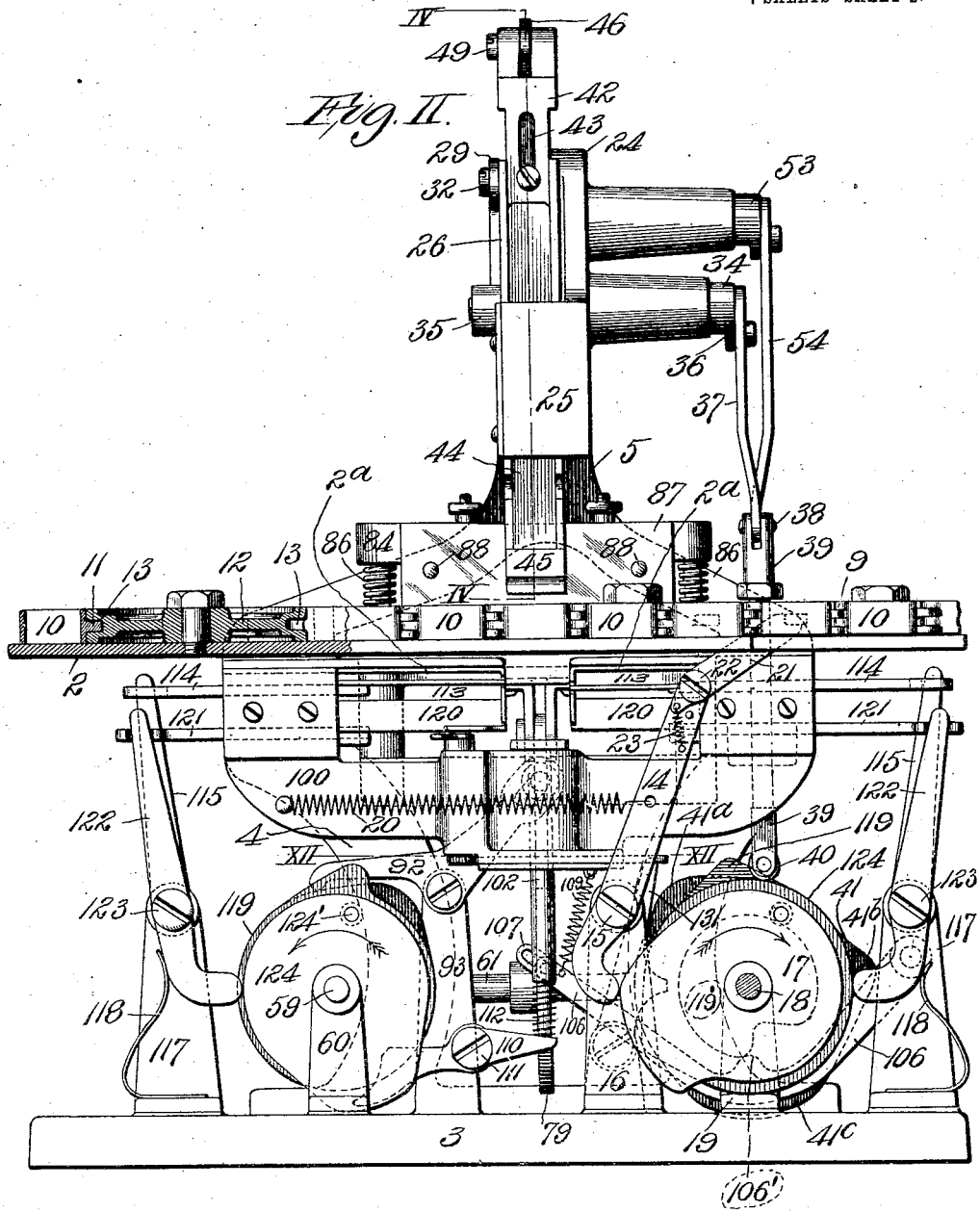

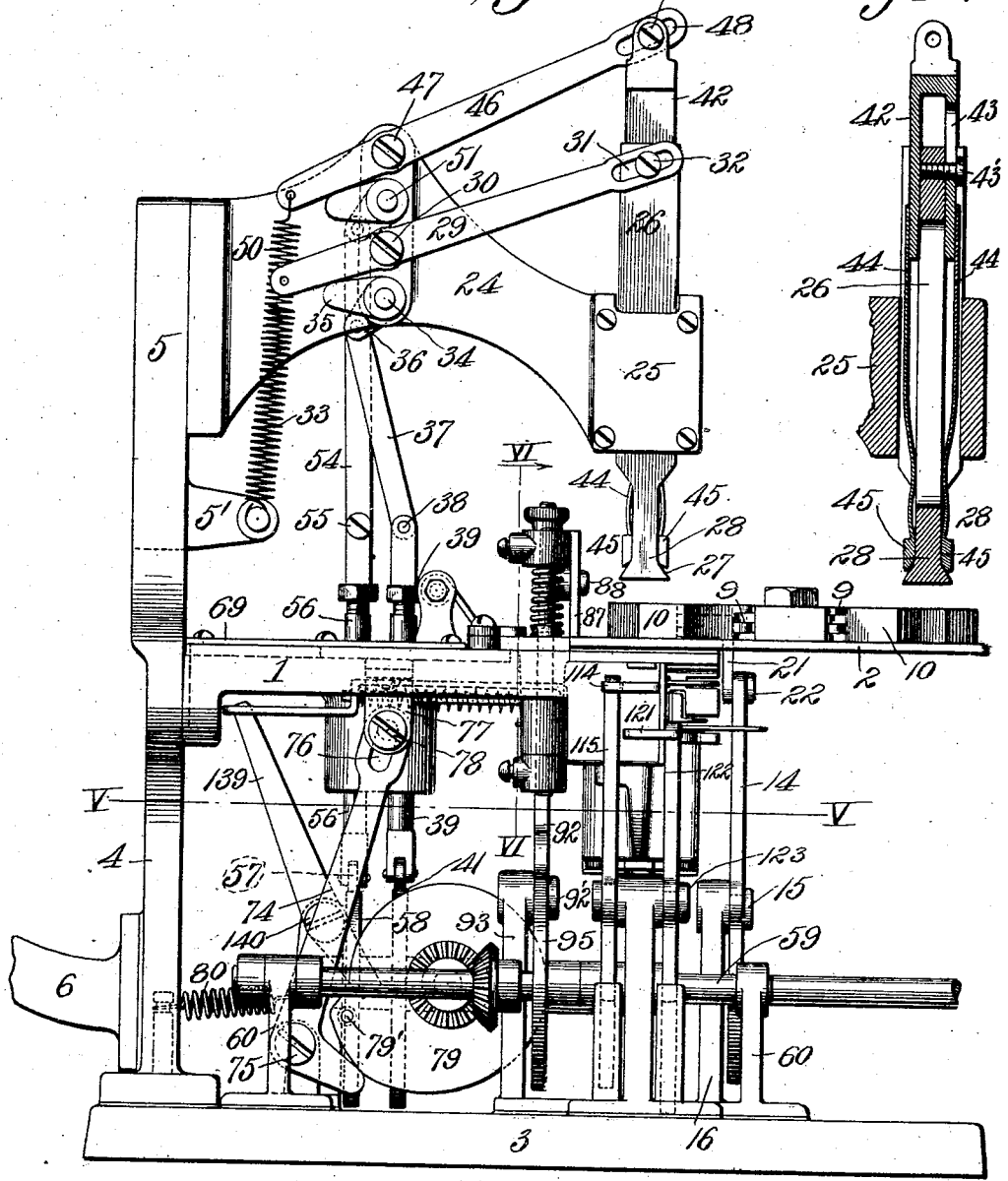

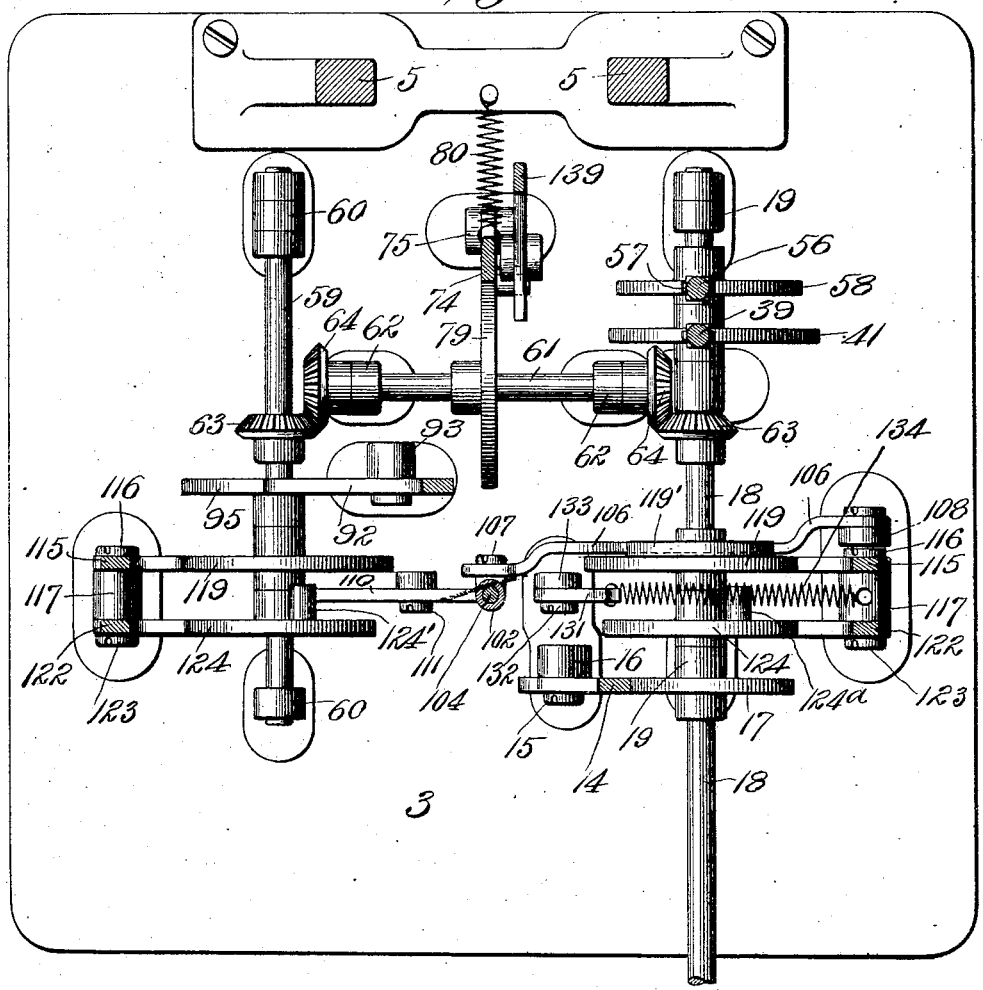

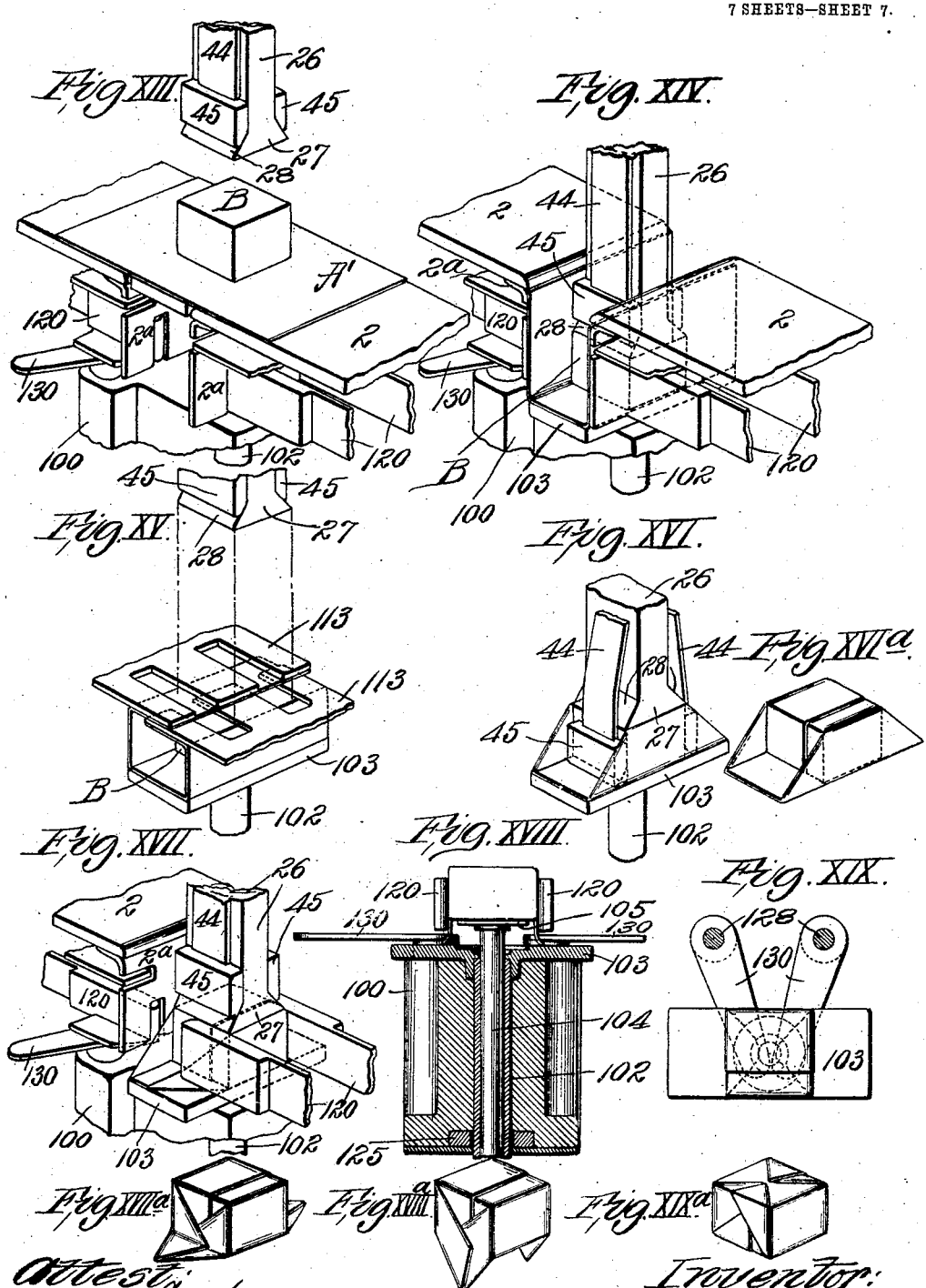

UNITED STATES PATENT OFFICE.

BENJAMIN B. MOSS, OF ST. LOUIS, MISSOURI, ASSIGNOR OF ONE-HALF TO JAMES M. DAVIS, OF LORAIN, OHIO.

CARAMEL-WRAPPING MACHINE.

No. 855,119.     Specification of Letters Patent.     Patented May 28, 1907.

Application filed August 7, 1905. Serial No. 273,254.

*To all whom it may concern:*

Be it known that I, BENJAMIN B. MOSS, a citizen of the United States, residing in the city of St. Louis, in the State of Missouri, have invented certain new and useful Improvements in Caramel-Wrapping Machines, of which the following is a full, clear, and exact description, reference being had to the accompanying drawings, forming part of this specification.

My invention relates to a machine for mechanically wrapping caramels; the machine including means by which the caramels are conveyed to the point at which they are to be wrapped, means for feeding a web of paper to the wrapping point, means for severing the wrapping sheet from the web, and means for producing the various folds in wrapping the caramels and discharging them from the machine after they are wrapped.

Figure I is a top or plan view of my machine. Fig. II is a front elevation of the machine. Fig. III is a side elevation of the machine. Fig. IV is a vertical section taken through the main and auxiliary plungers on line IV—IV, Fig. II. Fig. V is a plan view of the driving mechanism of the machine with the parts adjacent to and immediately above the power mechanism shown in horizontal section taken on line V—V, Fig. III. Fig. VI is an elevation of the paper cutting mechanism with portions of the machine frame adjacent to said cutting mechanism shown in vertical section taken on line VI—VI, Fig. III. Fig. VII is a vertical section taken through the paper feeding mechanism and paper cutting mechanism on line VII—VII, Fig. I. Fig. VIII is an elevation of the paper feeding mechanism with portions of the machine frame shown in section taken on line VIII—VIII, Fig. VII. Fig. IX is a top or plan view of the folding mechanism with portions of the table of the machine in part removed and in part broken away. Fig. X is a vertical longitudinal section taken approximately on irregular line X—X, Fig. IX. Fig. XI is a vertical cross section taken on line XI—XI, Fig. X. Fig. XII is a horizontal section taken on line XII—XII, Fig. II. Fig. XIII is a perspective view of the folding members of the machine with the parts shown in the positions assumed immediately after the wrapping sheet has been cut and before the folding operation is started. Fig. XIV is a similar view to Fig. XIII, showing the parts in the positions assumed after the first folding operation has taken place. Fig. XV is a perspective view of the parts utilized in accomplishing the second folding action. Fig. XVI is a perspective view of the parts utilized in accomplishing the third folding action. Fig. XVI$^a$ is a perspective view of a partially wrapped caramel with the wrapper in the condition existing after the parts shown in Fig. XVI have operated thereupon. Fig. XVII is a perspective view of the folding parts utilized in accomplishing the fourth folding action upon the caramel wrapper. Fig. XVII$^a$ is a perspective view of a partially wrapped caramel with the wrapper in the condition existing after the parts shown in Fig. XVII have been operated. Fig. XVIII is a vertical section of the parts utilized in moving the partially wrapped caramel, previous to the final folding action. Fig. XVIII$^a$ is a perspective view of a partially wrapped caramel with the wrapper in the condition existing after the parts shown in Fig. XVIII have operated thereupon. Fig. XIX is a top or plan view of the folding members utilized for completing the final folding action upon the caramel wrapper. Fig. XIX$^a$ is a perspective view of one of the completely wrapped caramels inverted.

1 designates the top main frame of my machine in front of which is a table 2.

3 is the base of the machine which is surmounted by a standard 4 that supports the top frame 1 and has an upper extension 5 serving to support a member to be hereinafter mentioned.

6 is a bracket arm extending rearwardly from the standard 4 and supporting a spindle 7 adapted to receive a roll 8 of paper from which the web A is to be fed into the machine to be cut into suitable sized sheets for wrapping caramels. The web of paper is adapted to be conveyed onto the table 2 at the location of a feed opening 2' therein (see Figs. X and XI).

9 designates an endless carrier consisting of pockets 10 linked together and open at their tops and bottoms. This endless carrier is adapted to travel in a horizontal plane on the table 2 and its pockets receive the caramels which are to be wrapped and convey them to the feed opening 2'. At the inner side of each pocket is a protuberance 11.

12 designates a pair of guide wheels on which the carrier 9 operates. The guide wheels are journaled to the table 2 and are provided with recesses 13 that receive the protuberances 11. Motion is imparted to the carrier 9 by a lever 14 consisting of an upper arm and a lower arm and pivoted at 15 to a post 16 surmounting the base 3 (see Figs. II, III and V). The lever 14 is actuated by a cam 17 fixed to a shaft 18 journaled in posts 19 surmounting the base 3, and which rides in engagement with the lower arm of the lever, said arm being held in contact with said cam by a spring 20 having one end secured to the lever and the other end secured to a fixed portion of the machine, as seen in Fig. II.

21 is a pawl pivoted at 22 to the upper arm of the lever 14 and controlled by a spring 23 connecting it to said lever. This pawl is adapted to engage the protuberances 11 of the carrier pockets 10, whereby movement is imparted to the carrier when the lever 14 is rocked through the medium of the cam 17. As said lever is rocked upon its forward stroke the pawl 21 by engagement with a protuberance 11, advances the carrier 9 a distance corresponding to the length of one of its pockets and immediately thereafter the lever is returned to its normal position by the spring 20 and the pawl is drawn rearwardly to be in position for engagement with the protuberance 11 of the next carrier pocket.

24 designates a bracket arm secured to the standard extension 5 and extending forwardly therefrom. This bracket arm terminates at its forward end in a vertically apertured guide box 25.

26 is a main upper plunger vertically positioned in said guide box and arranged to reciprocate therein. This main plunger is positioned immediately above the table feed opening 2' and it is provided at its lower end with a foot 27. The portion of the plunger immediately above said foot is provided with front and rear tapering faces 28 (see Figs. II, IV, XIII, XIV and XVI), the utility of which will hereinafter appear.

29 is a lever pivoted at 30 to the bracket arm 24 and through the medium of which reciprocation is imparted to the main plunger 26. The forward arm of this lever is provided with a slot 31 that receives a screw 32 which is seated in the main plunger and serves to connect the lever thereto. The rear arm of the lever 29 has connected to it a spring 33 (see Fig. III) that leads to an arm 5' projecting from the standard extension 5 and by which the forward arm of the walking lever is thrown upwardly to elevate the main plunger 26.

34 is a rock shaft journaled in the bracket arm 24 and having fixed thereto a lift arm 35 located beneath the rear arm of the lever 29 to operate thereagainst for the purpose of elevating said rear arm and moving the forward arm of said lever downwardly to lower the main plunger 26. The rock shaft 34 also has fixed to it a crank arm 36 to which is pivoted a pitman 37 that is in turn pivoted to a reciprocating rod 39 which passes loosely through the frame 1 of the machine and is provided at its lower end with a roller 40. This roller rides upon a cam 41 fixed to the shaft 18. The cam 41 is provided with three salient points $41^a$, $41^b$, and $41^c$, (see Fig. II), whereby said cam is caused upon each complete rotation to impart three independent movements to the reciprocating rod 39 and through the described mechanism connecting said rod, to the main plunger 26. The object in accomplishing this actuation of the main plunger will hereinafter appear.

42 designates an auxiliary plunger having a head which straddles the upper end of the main plunger 26 and is provided with a slot 43 through which a screw 43' passes and which permits of reciprocation of the auxiliary plunger on the main plunger. The auxiliary plunger includes a pair of tongues 44 that extend downwardly from the head of the auxiliary plunger to the foot of the main plunger and are adapted to ride upon the tapering faces 28 above said foot. Each tongue 44 is provided at its lower end with a foot 45 (see Figs. II to IV inclusive and XIII to XVII inclusive). These tongues and their feet are located at the forward and rear of the main plunger and the feet of the tongues are adapted to travel downwardly to points beneath the foot of the main plunger for a purpose that will hereinafter appear.

46 is a lever pivotally connected to the bracket arm 24 at 47 and having a forward arm provided with a slot 48 and pivoted to the auxiliary plunger by a screw 49 (Figs. II and III). The rear arm of the lever 46 is yieldingly held in lowered position by a spring 50 uniting it to the arm 5'.

51 is a rock shaft journaled in the bracket arm and having fixed thereto a lift arm 52 located beneath the rear arm of the lever 46 and by which said lever is oscillated against the action of the spring 50 to lower the auxiliary plunger 42. The rock shaft 51 is also provided with a crank arm 53, (see Figs. I and II). 54 is a pitman fitted to said crank arm and pivoted at 55 (see Fig. III) to a reciprocating rod 56 that operates loosely through the frame of the machine. In the lower end of this reciprocating rod is a roller 57 (see Fig. III) which rides upon a cam 58 having a single salient point to provide for a single downward movement of the auxiliary plunger 42 upon each rotation of said cam and the reciprocation of the reciprocating rod 56 which is connected to said auxiliary plunger in the manner described.

59 designates a driven shaft journaled in posts 60 surmounting the base 3 of the machine (see Figs. II, III and V). This driven shaft extends parallel with the shaft 18, which last named shaft is the main driving member of the machine and will hereinafter be termed the drive shaft. Motion is transmitted from the drive shaft 18 to the driven shaft 59 through the medium of a transmission shaft 61 that is journaled in posts 62 surmounting the base 3. Fixed to each of the shafts 18 and 59 is a beveled pinion 63 and fixed to each end of the transmission shaft is a beveled pinion 64, these pinions meshing with the pinions 63 which they oppose (see Fig. V).

The web of paper A is fed from the roll 8 to the table 2 at the location of its feed opening between a series of lower supporting fingers 65 and a series of upper fingers 66 surmounting the lower fingers but elevated sufficiently therefrom to permit of the passage of the web between said series (see Figs. I, VII and VIII).

67 is a paper carriage having fingers 68 that are adapted to operate between the lower paper supporting fingers 65 and adjacent to the sides of the frame 1 of the machine, the carriage being held depressed during its reciprocation toward the table of the machine and in its receding movement by retaining strips 69 (see Figs. I, III and VIII).

70 are posts surmounting the outer carriage fingers 68 and 71 is a shaft loosely mounted in said posts.

72 are presser fingers loosely fitted to the shaft 71 and having their free ends extending downwardly to rest upon the web A of paper to hold it tightly pressed against the lower paper supporting fingers 65 so that upon the forward reciprocation of the paper carriage, the paper will be moved forwardly upon said supporting fingers and conducted toward the table 2. The presser fingers 72 are yieldingly held against the web of paper by springs 73 coiled around the shaft 71 and engaging the presser fingers (see Figs. I, VII and VIII). Reciprocation is imparted to the paper carriage by a lever 74 pivotally supported at 75 (see Fig. III). This lever has an upper arm that is provided with a slot 76 and which is secured to a pair of ears 77 depending from the paper carriage, the means of attachment of said parts consisting of a screw 78 passing through said ears and through the slot in the lever. The lever 74 also has a lower arm which bears against a cam 79 (see Figs. II, III and V) that is provided with a single salient point and is fixed to a transmission shaft 61. 80 is a retracting spring connected at one end to the lever 74 and has connection at the other end with a fixed part of the machine. Each time that the cam 79 makes a complete rotation its salient point strikes against the lower arm of the lever 74 and actuates said lever to reciprocate said paper carriage forwardly and conduct the web of paper toward the table 2, and immediately after the salient point of the cam has passed the lower arm of the lever the retracting spring 80 acts to return the lever and the paper carriage to their normal positions.

81 designates a frame supported by the frame 1 adjacent to the table 2 and having a pair of downwardly extending legs 82 (see Figs. I, VI, VII, IX and XI). Upon the frame 81 is mounted a straight edge 83 over which the web of paper passes to be cut into sheets as it is fed onto the table 2 at the location of the feed opening therein.

84 designates a cross head that is carried by a pair of vertically reciprocating rods 85 which operate through the frame legs 82 and are surrounded by lift springs 86 that serve to sustain the cross head in an elevated position and to lift it into such position after it has been lowered in the manner hereinafter stated.

87 is a shearing knife that is carried by the cross head 84 and which is adapted to operate against the straight edge 83 to sever the web of paper that passes thereover to the table 2. The knife 87 is attached to the cross head 84 by bolts 88 (see Figs. II, III, VI and XI), which pass transversely through said members and are provided with nuts 89. These bolts are surrounded by draw springs 90 located between the cross head and the nuts 89 and which serve to hold the knife 87 in vertical alinement with the cutting face of the straight edge 83, in order that the knife will operate properly against said straight edge.

91 is a cross bar uniting the lower ends of the reciprocating rods 85 and serving to limit the upward movement of said rods by bearing against the lower ends of the legs 82 when the cross head 84 is in elevated position.

92 is a double-armed lever pivoted at 92' to a post 93 surmounting the base 3 of the machine (see Figs. II, III, V and VI). One arm of this lever has a slot-and-pin connection at 94 with the cross bar 91 and the other arm of the lever rides upon a cam 95 fixed to the driven shaft 59 and having a single salient point that is adapted to operate against the lever 92 for the purpose of causing it to impart downward movement to the cross bar 91 and the parts to which said cross bar is connected, whereby the knife 87 is lowered to shear the web of paper against the straight edge 83.

96 designates a presser bar located at the rear of the knife 87 and adapted to be moved downwardly onto the paper passing over the straight edge 83 when the knife 87 is lowered. This presser bar is carried by a pair of vertical rods 97 having their lower ends seated in the bar. These rods 97 are surrounded by tension springs 98 and they pass loosely through the cross head 84 to the upper side of said cross head and have fitted to their upper ends nuts 99 which are adapted to be adjusted to increase or diminish the tension in the springs 98. When the knife 97 is lowered to sever the web A of paper in the manner explained the presser bar 96 is moved downwardly onto the web of paper and holds it confined between said bar and the straight edge 83 while said knife is shearing a sheet of paper from the web, to remain upon the table 2 at the location of the feed opening 2'. This action takes place immediately after the web of paper has been fed forwardly by the paper carriage 67 and the presser bar remains in its lowered position to hold the web of paper until said carriage is returned to its normal position in the manner before explained, and subsequent to its feeding action. The forward end of the web of paper is thereby retained upon the straight edge 83 ready to be advanced to the table of the machine when the next paper feeding operation takes place.

100 designates a drop frame member secured to the forward ends of the side frame 1 and extending horizontally across the machine. This frame member is provided centrally with a vertical bore 101 that is located immediately beneath the table feed opening 2' (as seen in Fig. X).

102 is a main tubular lower plunger reciprocally positioned in the bore 101 and has fitted to its upper end a head 103 that is adapted to receive and support the caramels which are deposited through the table feed opening from the conveyer pockets 10.

104 is an auxiliary lower plunger reciprocally positioned in the tubular lower plunger 102 and bears at its upper end a head 105 that is adapted to seat in the head 103 so that its upper surface is normally flush with the upper surface of said head 103.

106 is a lever having slot-and-pin connection with the main lower plunger 102 at 107 (see Figs. II and V), the said lever extending beneath the drive shaft 18 and being pivotally connected to a post 108 surmounting the base of the machine. The lever 106 is provided intermediate of its ends with a boss 106' (see dotted lines Fig. II) that is adapted to ride against the periphery of a cam to be hereinafter mentioned and the end of said lever connected to the main lower plunger has connected to it a spring 109 attached to the frame member 100 and by which an upward pull is exerted upon the lever.

110 is a lever pivotally supported at 111 intermediate of its ends and having one of its arms arranged beneath the lower end of the auxiliary plunger 104. This lever is arranged to be actuated by means to be hereinafter described for the purpose of elevating said auxiliary plunger to lift its head 105.

112 is a spring surrounding the lower end of the auxiliary lower plunger and positioned between the lower end of the main lower plunger and the lever 110, this spring being adapted to exert a downward pressure against the lever arm beneath it and permit the descent of the auxiliary plunger after said plunger has been elevated.

113 designates a pair of horizontally disposed reciprocating forked folder plates that are arranged for reciprocation beneath the table feed opening 2' (see Figs. II, IX, X, XI and XII to XV inclusive). These folder plates are arranged in different horizontal planes, as seen most clearly in Figs. X and XV, and they are arranged to reciprocate inwardly across the space beneath the table feed opening so that one of the plates may first be advanced across said space and the other plate be then advanced from the opposite direction and overlap the first plate. The folder plates 113 are carried by slide bars 114 reciprocally positioned in suitable slideways in the forward ends of the sides of the machine frame 1 (see Fig. IX). These slide bars are reciprocated by double-armed lever 115 (see Figs. II, III, V and X) which are pivoted at 116 to posts 117. The lower arms of the levers 115 are pressed inwardly toward the drive shaft 18, and driven shaft 59 by springs 118 and they bear against cams 119 fixed to said shafts and having single salient points that operate against the lower arms of the levers upon each complete rotation of said shafts, whereby the levers are rocked to reciprocate the slide bars 114 and the folder plates 113 inwardly for folding action. As soon as the salient points of said cams pass the lower arms of the levers, said levers are returned to their normal positions by the springs 118 previously mentioned, whereby the folder plates are again thrown outwardly.

120 designates two pairs of folder fingers that are disposed vertically beneath the folder plates 113 and are adapted to be reciprocated across the space beneath the table feed opening 2', the said pairs of folder fingers being arranged to be so actuated that one pair will first be reciprocated across said space for folding action and retracted and the other pair be thereafter reciprocated across the space for folding action. The folder fingers 120 and the folder plates 113 are all guided in their reciprocation by perforated guide members 2ª secured to the table 2 of the machine at its lower side and having downturned inner ends. The folder fingers 120 are carried by slide bars 121 reciprocally positioned in the forward ends of the sides of the main frame 1 and they are engaged by the arms of double-armed levers 122 which are pivoted at 123 to the posts 117. The lower arms of said levers are pressed inwardly toward the drive and driven shafts 18 and 59 by springs 118 and they ride against cams 124 which are fixed to the shafts 18 and 59 and have single salient points. These last named cams serve to operate the levers 122 so that they will impart reciprocation to the pairs of folder fingers 120 in the same manner as the levers 115 impart reciprocation to the folder plates 113.

Upon one of the sides of the cam 119 is a cam 119' (see Fig. V and dotted lines Fig. II) against which the lever 106 operates. This last named cam is provided with a depression in its periphery into which the boss 106 of said lever is adapted to enter when the cam is rotated to bring said depression to said boss, thereby permitting action of the spring 109 to elevate the inner end of the lever 106 and raise the main lower plunger 102. After said cam has sufficiently continued its rotation to cause its depression to pass the boss on said lever, the cam again forces the lever downwardly and said plunger is again lowered. The cam 124 is provided with a pin 124' (see Figs. II and V) that is arranged to move into engagement with the outer arm of the lever 110 to trip said lever and cause its inner arm to act against the lower end of the auxiliary lower plunger 104 for the purpose of elevating said plunger.

125 designates a reciprocatory rack bar that is slidably positioned beneath the central portion of the drop frame 100 in a suitable runway and is provided at its front and rear edges with rack teeth 126 (see Figs. X and XII). This rack bar is provided with an elongated opening 127 to permit of the passage of the lower plungers 102 and 104 therethrough without interfering with the reciprocation of the bar.

128 are rock shafts vertically mounted in the frame member 100 and having fixed to their lower ends pinions 129 that are arranged in mesh with the rack teeth 126.

130 are folder arms fixed to the upper ends of the rock shafts 128 and arranged to be rotated in the arc of a circle immediately above the main lower plunger head 103 when the rack bar 125 is reciprocated in a forward direction, the said fingers at this time moving toward each other above said plunger head. The rack bar 125 is actuated by a double-armed lever 131 pivoted at 132 to a post 133 and having its upper arm loosely seated in the rack bar, as seen in Fig. X. The lever 131 is yieldingly held by a spring 134 (see Fig. V) whereby the rack bar 125 is retracted and the folder arms 130 are normally held in outturned positions. The lower arm of said lever 131 is arranged to be engaged by a stud 124ᵃ carried by one of the cams 124 and which is arranged to move into engagement with said lower lever arm upon the rotation of said cam to reciprocate said rack bar inwardly and actuate the folder arms 130 for folding action.

135 designates a reciprocating ejector bar by which the caramels are ejected from the machine after being wrapped. This ejector bar is mounted in suitable bearings and it extends rearwardly from the space in which the caramels are folded and wrapped, as seen most clearly in Figs. III, VII and XI. The bar has a downturned forward end 136 that is adapted to press against the caramels when said bar is moved forwardly and it is fitted to a guide rod 137 surrounded by a retractile spring 138 that serves to retract the ejector bar after it has been reciprocated to discharge the wrapped caramels. The ejector bar is moved forwardly by a double-armed lever 139 having an upper arm loosely fitted to the bar and pivotally supported intermediate of its ends at 140 (see Fig. III). The lower arm of said lever is arranged in the path of travel of a stud 79' carried by the cam 79, whereby upon the rotation of said cam, rocking movement is imparted to said lever.

The folding operations in wrapping the caramels in my machine are carried out in the following manner: As each of the carrier pockets 10 conveys a caramel to the table feed opening 2', the caramel B is brought to rest upon the severed wrapper sheet shown at A' Fig. XIII, that has been cut from the web of paper A. At this time the head 103 of the main lower plunger 102 is in elevated position, being upheld by its actuating mechanism and it supports the caramel upon its wrapper sheet. The machine being in motion the main lower plunger descends and at the same time the main upper plunger moves downwardly so that the caramel and wrapper sheet are carried into the space or pocket beneath the table feed opening into which the wrapper folding members operate. The caramel and wrapper sheet are thereby moved downwardly into the position seen in Fig. XIV, and the sides of said sheet are folded upwardly into U-shape into the space or pocket mentioned. The main upper plunger then rises as a precedent to the second wrapper folding action. This second wrapper folding action is accomplished by the forward reciprocation of first one of the horizontally disposed folder plates 113 and then by forward reciprocation of the other horizontally disposed folder plate 113 whereby the upturned side portions of the wrapper sheet are folded over above the caramel, as seen in Fig. XV. Immediately after this action has taken place and just at the time that the horizontal folder plates 113 are receding the main upper plunger 26 again descends and its foot by bearing against the folded over portions of the wrapper sheet, serves to confine them and prevent their unfolding. While the main upper plunger is in this position the auxiliary upper plunger moves downwardly and its yielding arms 44 are spread outwardly as they pass the tapered foot of the main upper plunger, whereby their feet 45 are moved to press against the topmost portions of the partially folded wrapper sheet at the ends thereof and fold said portions downwardly against the ends of the caramel as seen in Figs. XVI and XVI$^a$. The auxiliary upper plunger then again moves upwardly and the main upper plunger remains lowered to rest above the partially wrapped caramel, as seen in Fig. XVII. One pair of the vertically disposed folder fingers 120 is then reciprocated inwardly to the wrapping space or pocket and acts to fold the projecting side portions of the wrapper sheet inwardly to the ends of the caramel, and as this pair of folder fingers recedes the other pair of folder fingers advances and folds the opposite projecting side portions of the wrapper sheet inwardly so that said side portions are folded into the condition seen in Fig. XVII$^a$. The auxiliary lower plunger 104 then moves upwardly due to its operating mechanism being so actuated as to cause said plunger to be reciprocated at this particular time. As said auxiliary plunger rises the partially wrapped caramel is elevated on the plunger head 105 until the caramel is at a sufficient elevation to permit of the passage of the folder arms 130 beneath the caramel. While the caramel is being so lifted one pair of the vertical folder fingers 120 remains in a position straddling the partially wrapped caramel and bearing against the folds at its ends so that the remaining unfolded end portions of the wrapper sheet as seen in Fig. XVII$^a$, are pressed downwardly into vertical positions, as seen in Fig. XVIII. The folder arms 130 are then rotated by their actuating mechanism so that they move in arcs of circles toward each other into the positions seen in Fig. XIX, whereby the unfolded end portions of the wrapper sheet are carried inwardly beneath the caramel. Just at this time the auxiliary lower plunger 104 recedes and said ends of the wrapper sheet are carried above the head 105 of said plunger, thus completing the last fold. The pair of folder fingers 120 previously holding the caramel then recede and the main upper plunger again moves downwardly onto the wrapped caramel to set the wrapper sheet folds last produced by pressing said folds onto the head of the main lower plunger and after accomplishing its last office said main upper plunger recedes. The caramel having been completely wrapped is next ejected from the wrapping space by the forward reciprocation of the ejector bar 135 which is reciprocated forwardly by its actuating mechanism previously described.

I claim as my invention:

1. In a caramel wrapping machine, the combination of a table provided with a feed opening, folding mechanism located beneath said table, a main upper plunger arranged to deliver the caramels and their wrapper sheets through said feed opening to said folding mechanism, an auxiliary upper plunger having yielding arms arranged to ride against said main upper plunger and adapted to be projected beyond the lower end of the main plunger for wrapper folding action, substantially as set forth.

2. In a caramel wrapping machine, the combination of a table provided with a feed opening, folding mechanism located beneath said table, a main upper plunger having a foot provided with tapering sides, and an auxiliary upper plunger having spring arms provided with feet arranged to ride against the tapering sides of said main plunger foot and adapted to be projected beyond said foot for wrapper folding action, substantially as set forth.

3. In a caramel wrapping machine, the combination of a table provided with a feed opening, means for delivering caramels and their wrapper sheets through said feed opening to partially fold the wrapper sheets, horizontally disposed reciprocating folder plates located in proximity to said feed opening, vertically disposed reciprocating pairs of folder fingers located beneath said folder plates, and rocking folder arms located beneath one pair of said folder fingers, substantially as set forth.

4. In a caramel wrapping machine, the combination of a table provided with a feed opening, means for delivering the caramels and their wrapper sheets through said feed opening, means for folding the wrapper sheets to the caramels at their ends, means for elevating the caramels and their wrapper sheets after said sheets have been folded at the ends, and rocking folder arms arranged to fold the unfolded end portions of the wrapper sheets while they are in upheld position, substantially as set forth.

5. In a caramel wrapping machine, the combination of a table provided with a feed opening, a main lower plunger on which the caramels and their wrapper sheets are lowered through said feed opening, means for folding the top and end portions of said wrapper sheets, an auxiliary lower plunger operating through said main lower plunger and by which the partially wrapped caramels are elevated, and means for completing the folding of the wrapper sheets while the caramels are in uplifted position, substantially as set forth.

6. In a caramel wrapping machine, the combination of a table provided with a feed opening, a main lower plunger on which the caramels and their wrapper sheets are lowered through said feed opening, means for folding the top and end portions of said wrapper sheets, an auxiliary lower plunger operating through said main lower plunger and by which the partially wrapped caramels are elevated, and rocking folder arms arranged to move beneath the partially wrapped caramels to complete the wrapper folding action, substantially as set forth.

In testimony whereof, I have hereunto set my hand.

BENJAMIN B. MOSS.

In presence of—
J. H. MONTGOMERY,
CHAS. E. COE.